United States Patent [19]

Sasaki et al.

[11] Patent Number: 5,587,418
[45] Date of Patent: Dec. 24, 1996

[54] THERMOSETTING COATING COMPOSITION AND COATED BODY

[75] Inventors: Ryo Sasaki, Atsugi; Toshiro Ina, Osaka, both of Japan

[73] Assignees: Nissan Motor Co., Ltd, Kanagawa; TBL Co., Ltd., Osaka, both of Japan

[21] Appl. No.: 432,140

[22] PCT Filed: Sep. 9, 1994

[86] PCT No.: PCT/JP94/01492

§ 371 Date: Jun. 5, 1995

§ 102(e) Date: Jun. 5, 1995

[87] PCT Pub. No.: WO95/07320

PCT Pub. Date: Mar. 16, 1995

[30] Foreign Application Priority Data

Sep. 10, 1993 [JP] Japan ..................... 5-249961

[51] Int. Cl.$^6$ .................. C08L 51/00; C08L 61/28; C08L 33/08; C08L 23/28
[52] U.S. Cl. .................. 524/504; 523/205; 524/512; 524/516; 525/66; 525/160; 525/164; 525/285; 525/303; 428/201; 428/203; 428/204; 428/206; 428/207; 428/208; 428/502; 428/520; 428/522
[58] Field of Search .............. 523/205; 524/504, 524/512, 516; 525/66, 160, 164, 285, 303; 428/201, 203, 204–206, 207, 208, 502, 520, 522; 293/120, 121, 122, 128

[56] References Cited

FOREIGN PATENT DOCUMENTS 2-124986  5/1990  Japan.

Primary Examiner—Peter A. Szekely

[57] ABSTRACT

The present invention intends to provide a thermosetting coating composition provided with workability, excellent adhesion, weatherability, good appearance, etc. capable of use in a primerless colored base coat and top clear coat by a 2-coat, 1-bake method on a polyolefinic substrate. Moreover, the present invention intends to provide a coated body having excellent adhesion, weatherability, good appearance, etc. realized by a 2-coat, 1-bake method. This thermosetting coating composition is a composition comprising a graft copolymer obtained by copolymerizing acrylic monomer, unsaturated carboxylic acids, acrylic monomers containing hydroxyl group with chlorinated polyolefin containing anhydride in the presence of organic solvents. This coating composition is available for use as a primerless colored base coat 2-coat, 1-bake coating on the polyolefinic substrates.

17 Claims, No Drawings

5,587,418

THERMOSETTING COATING COMPOSITION AND COATED BODY

TECHNICAL FIELD

The present invention concerns a thermosetting coating composition. More specifically, it concerns a coating composition which is a colour substrate fit for polypropylene base such as a super high-strength polypropylene bumper substrate, etc. and which is capable of providing the base material with excellent adhesion especially through two times coating one time baking called "wet on wet system", made without primer by using this colour base and top clear coat and 1 bake (wet-on-wet system) and which is also capable of forming thermosetting coated film having long-term weatherability, chemical resistance, waterproofing and highly glossy and vivid coated film appearance.

BACKGROUND ART

Conventional coloured base coat for car body, which are generally made of polyester, melamine, cellulose acetate butyrate resin ("CAB resin") or acrylic melamine resin, hardly have any adhesion to polyolefinic substrates consisting of so-called crystalline polyolefins with low polarity.

For that reason, paints containing modified or copolymerized chlorinated polyolefin containing anhydride are used as colored base coat for the coating on polyolefinic substrates. Though they all have good adhesion to such substrates, these paints are used only for primer coating or 1-coat top coating because of such problems as no hardening, poor adhesion or poor secondary adhesion after washing with water, etc., which are vital problems for coating materials, in the coating made by the method of directly coating a colour base having painting pigment and completing the coating with a single baking, i.e. primerless 2-coat 1-bake system (wet on wet system of coloured base coat and top clear coat).

Moreover, the paints containing modified or copolymerized chlorinated polyolefin containing anhydride which are supplied today are mostly of lacquer type or urethane crosslinking with polyisocyanate and of short working life and, therefore, it was practically very difficult to use them by the primerless 2-coat, 1-bake method.

Furthermore, the coated film obtained had a defect of yellowing regarding long-term weatherability and problems such as poor waterproofing, poor chemical resistance, etc. More specifically, they had a problem of producing dechlorination from polyolefinic substrate and modified chlorinated polyolefin containing anhydride, causing yellowing of aluminium pigment and top coat clear, etc.

As attempts for improving the polyolefinic substrate itself, various trials are being made such as plasma treatment (surface oxidation by oxygen plasma), frame treatment (surface oxidation by frame), ultraviolet ray treatment (furnishing of functionality by ultraviolet ray), etc. as measures for removing trichloroethane (improvement of adhesion). However, those measures also have problems such as unstable adhesion, etc. depending on the kind of polyolefinic substrate (degree of non polarity) and still remain in the stage of study. Moreover, while it is possible to improve adhesion by introducing functional group into the polyolefinic substrate, it makes the substrate costly.

Because of such defects, said formation of coated film is still insufficient in commercial value and has therefore not yet put to practical use. For that reason, the present invention intends to provide a thermosetting coating composition provided with workability, excellent adhesion, weatherability, good appearance, etc. capable of primerless coloured base coat and top clear coat by a 2-coat, 1-bake method on the polyolefinic substrates. Moreover, the present invention intends to provide a coated body having excellent adhesion, weatherability, good appearance, etc. realized by a 2-coat, 1-bake method.

DISCLOSURE OF THE INVENTION

In view of the current situation described above, the inventors of the present application assiduously made studies to solve said defects and found that formation of coated film by primerless 2-coat, 1-bake method furnishing polyolefinic substrates with adhesion can be achieved properly by dispersing the pigment in the paint with melamine resin and bridging it with acrylic copolymer which make graft copolymerization with chlorinated polyolefinic copolymer containing anhydride by means of this melamine resin under a thermal energy, and finally achieved the present invention.

Namely, the first to sixth inventions of the present application provide a thermosetting coating composition comparing graft copolymer obtained by copolymerizing acrylic monomers, unsaturated carboxylic acids, acrylic monomers containing hydroxyl group with chlorinated polyolefin containing anhydride under organic solvent, and melamine resin and available for use as primerless coloured base coat of 2-coat 1-bake coating on the polyolefinic substrates. Moreover, the 7th and 8th inventions of the present application provide coated bodies comprising substrate coloured base coating on the surface of this substrate and top clear coat coating on the surface of this coloured base coat and realized by the method of 2-coat 1-bake coating which consists in performing baking after the coating of coloured base coat and top clear coat, characterized in that this substrate is a polyolefinic based material with stable surface properties and that the coloured base coat is said thermosetting coating composition. It is desirable that the substrate be a bumper made of super high-strength polypropylene securing sufficient adhesion by washing with water.

Here, primerless coloured base coat of 2-coat 1-bake coating refers to a paint containing tinting pigment to be directly coated on polyolefinic substrate the coating of which is completed by coating a top clear coat on it by wet-on-wet system and making a single baking.

Said graft copolymer preferably comprises acrylic monomers representing 30 to 94.5 wt % of total volume of whole monomers, unsaturated carboxylic acids representing 0.5 to 7.0 wt % of total volume of whole monomers and acrylic monomers containing hydroxyl group representing 5 to 25 wt % of total volume of whole monomers for chlorinated polyolefin containing anhydride, and a number-average molecular weight of approximately 10,000 to 25,000.

Moreover, said melamine resin is butyl etherified melamine resin and the graft copolymer to melamine resin ratio in solids content weight is preferably 70–90 to 30–10.

Furthermore, a coated film formed on a polyolefinic substrate is liable to produce dechlorination from the polyolefinic substrate and the primerless formation of thermosetting coated film and cause deterioration of clear coated film and pigment (aluminium) under the influence of Cl ions. For that reason, it is also desirable to make the coating composition contain dechlorinating catcher such as basic magnesium, basic aluminium ($CO_3'$ is easily displaced by Cl), etc. to delay deterioration (yellowing of resin, discoloration of aluminium, storage stability). This dechlorinating catcher preferably represents 0.5 to 2.5 wt % against the total solid content weight of said graft copolymer and melamine resin.

In so-called metallic paints, etc., there are cases where aluminium is contained in the paint. However, because ordinary aluminium deteriorates and causes discoloration and peeling by agglomeration under the influences of Cl ions brought about by said dechlorination, it is desirable to use resin coated aluminium pigment as aluminium. This resin coated aluminium preferably represents 5 to 25 wt % for the total solids by weight of said graft copolymer and melamine resin.

Still more, since polyolefinic substrates deteriorate very rapidly under the influences of ultraviolet ray, it is desirable to contain an ultraviolet ray absorber and a light stabilizer (in the paint) to delay deterioration of the substrate.

The present invention will be described more in detail hereinbelow.

The coating composition of the present invention is realized by blending melamine resins (B) with graft copolymer (A) obtained by copolymerizing acrylic monomers containing hydroxyl group (e.g. (a-2), unsaturated carboxylic acids (e.g. (a-3)), acrylic monomers (e.g. (a-4)) with chlorinated polyolefin containing acid anhydride (e.g. (a-1)) in the presence of an organic solvent and also blending a tinting pigment (F) as coloured base coat. Coated film is formed as a result of bridging between the graft copolymer (A) and the melamine resins (B) produced with baking under a thermal energy.

The solid content ratio of said chlorinated polyolefin (a-1) containing anhydride to said respective copolymers (a-2), (a-3), (a-4) shall be adjusted to 5:95 to 40:60 and more preferably to 10:90 to 20:80.

Moreover, the present invention intends to provide a method of formation of a thermosetting coated film realized by blending a dechlorinating catcher (C), resin coated aluminium (D) and ultraviolet ray absorber & light stabilizer (E) for the said solid content ratio of (A) and (B).

Here, polyolefin with a chlorination ratio of 40% or under, preferably 15 to 30%, is desirable as said chlorinated polyolefin (a-1). To enumerate only those which are particularly representative as such polyolefin, we may give the names of ethylene, propylene, ethylene-propylene copolymer, 1-butene, propylene-butene copolymer, ethylene-α-olefin copolymer, propylene-butadine copolymer, etc. Particularly desirable among them are propylene and ethylene-α-olefin copolymer, and we may cite copolymers chlorinated with carbon tetrachloride, etc. for acid modified polyolefins such as maleic anhydride, citraconic anhydride, itaconic anhydride, etc. as unsaturated carboxylic acids. As for proportion of this chlorinated polyolefin, 15 to 30% is most desirable because no transparent coated film uniform in solubility with melamine resins can be obtained and the adhesion drops in case the rate of chlorination exceeds 40%.

Furthermore, to enumerate only those which are particularly representative as said acrylic monomers (a-2) containing hydroxyl groups are 2-hydroxy ethyl (meth) acrylate, 2-hydroxy propyl meth acrylate, 3-hydroxy propyl meth acrylate, 2-hydroxy butyl meth acrylate, 3-hydroxy butyl meth acrylate, 4-hydroxy butyl meth acrylate, etc. When the quantity of use of these acrylic monomers (a-2) containing hydroxyl group is smaller than 5 wt %, solvent resistance, intercoat adhesion and chemical resistance are liable to become insufficient with a drop of hardening capacity. On the other hand, when this quantity is larger than 25%, adhesion with polyolefinic substrate and weatherability of coated film, etc. are liable to drop. For that reason, it is desirable to keep the quantity of use of these acrylic monomers (a-2) containing hydroxyl group in the range of 5 to 25 wt % of the total weight of whole monomers or at a hydroxyl value (solid content) of 22.3 to 111.4, more preferably 8 to 22 wt % of the total weight of whole monomers or at a hydroxyl value (solid content) of 35.6 to 80.2.

Still more, to enumerate only those which are particularly representative as said unsaturated carboxylic acids (a-3) are meth acrylic acid as unsaturated monocarboxylic acid and various kinds of unsaturated monocarboxylic acids such as maleic acid anhydride, fumaric acid, itaconic acid, citraconic acid, mesaconic acid, etc. as unsaturated carboxylic acids. The quantity of use of these unsaturated carboxylic acids is 0.5 to 7.0 wt %, and any quantity of these compounds smaller than 0.5 wt % leads to poor bridging with melamine resins, insufficient hardening capacity and poor gasoline resistance. On the other hand, if this quantity is larger than 7.0 wt %, the appearance and the waterproofing of the coated film obtained drop and the storage stability also deteriorates. Therefore, this quantity shall preferably be maintained in the range of 0.5 to 7.0 wt % of the total weight of whole monomers or at an acid value (solid content) of 3.8 to 53.4, more preferably 1.0 to 3.0 wt % of the total weight of whole monomers or at an acid value (solid content) of 7.6 to 22.9.

Next, to enumerate only those which are particularly representative as acyclic monomers (a-4) copolymerizable with said (a-2), (a-3) respectively, are various kinds of (meth) acrylates such as methyl (meth) acrylate, ethyl (meth) acrylate, n-propyl (meth) acrylate, i-propyl (meth) acrylate, n-butyl (meth) acrylate, i-butyl (meth) acrylate, tert-butyl (meth) acrylate, 2-ethyl-hexyl (meth) acrylate, lauryl (meth) acrylate, cyclo-hexyl (meth) acrylate, benzyl (meth) acrylate, dibromopropyl (meth) acrylate, tribromopropyl (meth) acrylate, aceto-acetoxyl ethyl (meth) acrylate, etc.

Furthermore, the solid content ratio of said chlorinated polyolefin containing anhydride and acrylic copolymer (A) to melamine resins (B) is (A):(B)=70 to 90/30 to 10 wt %, preferably a solid content ratio of (A):(B)=75 to 85/25 to 15 wt %. Here, when (B) becomes 10 wt % or under, the waterproofing and the solvent resistance drop. On the other hand, if (B) is 30 wt % or over, the appearance and impact resistance will drop.

In addition, because the present invention is characterized in that the dispersion of pigment (F) in particular is made with melamine resins (B), it can naturally disperse pigments of low oil absorption quantity such as titanium oxide or iron dioxide based pigments. However, with pigments of poor dispersion and comparatively high oil absorption quantity such as quinacridone pigments, phthalocyanine pigments and carbon black which are organic pigments in particular, 20 to 25 % is a proper quantity of melamine resins (B) for securing good dispersion of pigment without affecting the coated film performances.

Here, to enumerate only those which are particularly representative as pigments, are titanium dioxide as white pigment, iron oxide flavanthrone, azo isoindolinone, benzimidazolone, titanium oxide as yellow pigments, isoindolinone, iron oxide, indanthrene as orange pigments, perylene, monoazo, benzimidaazolone, quinacridone, anthroquinone, diketo pyrrole, indanthrene as red, phthalocyanine pigments, and azo as green pigment, carbon as black pigments, etc.

Moreover, said dechlorinating catcher may well be used in the range of 0.5 to 2.0 wt % for the total solid content by weight of chlorinated polyolefin containing anhydride and acrylic copolymer (A) and melamine resins (B). While the effect becomes too large, the gloss and the waterproofing drop if this quantity of use exceeds 2 wt %. To enumerate examples of such dechlorinating catcher, are basic magnesium, aluminium, hydroxy, carbonate, hydrate, epoxy resin based materials. As typical epoxy resin product, there is so-called bisphenol A type epoxy resin (epoxy equivalent 170 to 250, molecular weight 300 to 400) which is a condensate of bisphenol A and epichlor(o)hydrine.

Furthermore, said resin coated aluminium (D) may well be used in the range of 5 to 25 wt % for the total solids by weight of (A) and (B). No discoloration or interfacial peeling due to deterioration of aluminium are produced even with ordinary aluminium at a proportion under 5 wt % but the appearance quality deteriorates at over 25 wt %. To enumerate examples of such resin coated aluminium, we may cite FZ or FM series (products of Toyo Aluminium K.K.), CR series (products of Asahi Chemical Metals K.K.), etc.

Still more, said ultraviolet ray absorber and light stabilizer (E) may well be used in the range up to 5 wt % for the total solids content by weight of (A) and (B). When they are used in excess of 5 wt %, the waterproofing drops with occurrence of precipitation though the effect becomes greater and it is also disadvantageous in respect of costs.

To enumerate examples of such ultraviolet ray absorber and light stabilizer, we may cite as ultraviolet ray absorber 3-[3-(2H-benzotriazol-2-yl)-5-t-butyl-A-hydroxyphenyl] benzotriazole, 2-[2-hydroxy-3,5-bis (1,1-dimethylbenzyl) phenyl]-2H-benzotriazole, ethane diamide-N-(2-ethoxy phenyl)-N'-(4-isododexyl phenyl), etc.

As for light stabilizer, we may cite bis (2, 2, 6, 6-tetra methyl-1-octyl oxy-4-piperizyl) decanodioate, 1,3,8-triaza spiro (4, 5,) decane-2, 4-dione-8-acetyl-3; -dodecyl-7, 7, 9, 9-tetramer, 2, 2, 4, 4-tetra methyl-20-(β-lauryl-oxycarbonyl)-ethyl-7-oxa-3, 20-diaza dispiro (5, 1, 11, 2) heneicosan-21-on, bis (1, 2, 2, 6, 6-pentamethyl-4-piperidyl) sebacate, bis (1, 2, 2, 6, 6-pentamethyl-4-piperidyl 1-2-butyl-2-(4-hydroxy-3, 5-di-tertiary butylpenzyl) propanedioate, 2-(3-5-di-t-butyl-4-hydroxy benzyl)-2-n-butyl maronic acid bis (1, 2, 2, 6, 6-pentamethyl-4-piperidyl), bis (1, 2, 2, 6, 6-pentamethyl-4-piperidyl) sebacate, etc.

Yet more, as a top clear coat coated on said coloured base coat, one may select as desired a product which is usually used for 2-coat, 1-bake coatings and we may cite a thermosetting top clear coating based on acrylic melamine, fluorocarbon resin, silicon modified acrylic clear, acid-epoxy curing resin, acrylic resin, oil-free polyester resin, aminoalkyl resin, 2-part acrylic urethane, 2-part fluorocarbon modified urethane resin, 2-part silicon modified urethane, etc.

PREFERRED EXAMPLE OF THE INVENTION

Next, the present invention will be explained concretely with examples and references. All parts and percentages given there are those in weight.

EXAMPLE 1

Put 500 parts of chlorinated polyolefin containing anhydride obtained by chlorinating maleic anhydride with carbon tetrachloride; rate of chlorination=24%, solid content=30% (or under, hereinafter indicated simply as chlorinated polyolefin containing anhydride in this example and tables) and 850 parts of toluene in a 4-neck reaction vessel flask equipped with agitator, thermometer and cooler, maintain the temperature inside the flask at 75° to 85° C., and drip in it a mixture consisting of 450 parts of isobutyl methacrylate, 250 parts of cyclohexyl meth-acrylate, 130 parts of acrylic acid-2-hydroxyl ethyl and 20 parts of acrylic acid and a solution obtained by melting 5 parts of benzoyl peroxide and 5 parts of azobisisobutyrnitrile in 300 parts of toluene for 3 hours, and maintain for another 10 hours at the same temperature even after the end of dripping to let continue the reaction.

From this, we got a chlorinated polypropylene modified acrylic resin with a non-volatile content of 40.4% and a number-average molecular weight of 18,000 (Example 1). Table 1 indicates those results.

Moreover, Table 1 also indicates products of the same composition with said example 1 but with different loads as examples 2 to 7. In the explanation given hereafter, specific chlorinated polyolefin containing anhydride and acrylic copolymers of examples 1 to 7 will be abbreviated as chlorinated polyolefin and acrylic copolymers (A1) to (A7).

TABLE 1

| | Example 1 | Example 2 | Example 3 | Example 4 | Example 5 | Example 6 | Example 7 |
|---|---|---|---|---|---|---|---|
| Chlorinated polyolefin and acrylic copolymers | | | | | | | |
| Chlorinated polyolefin containing anhydride | 500 | 500 | 500 | 500 | 500 | 330 | 1000 |
| Toluene | 850 | 850 | 850 | 850 | 850 | 970 | 500 |
| Isobutyl | 450 | 460 | 440 | 480 | 420 | 480 | 350 |

TABLE 1-continued

|  | Example 1 | Example 2 | Example 3 | Example 4 | Example 5 | Example 6 | Example 7 |
|---|---|---|---|---|---|---|---|
| (meth)-acrylate |  |  |  |  |  |  |  |
| Cyclohexyl (meth)-acrylate | 250 | 250 | 250 | 270 | 230 | 270 | 200 |
| 2-hydroxy ethyl (meth)-acrylate | 130 | 130 | 130 | 80 | 180 | 130 | 130 |
| Acrylic acid | 20 | 10 | 30 | 20 | 20 | 20 | 20 |
| Benzoyl peroxide | 5 | 5 | 5 | 5 | 5 | 5 | 5 |
| Azobisisobutyronitrile | 5 | 5 | 5 | 5 | 5 | 5 | 5 |
| Toluene | 300 | 300 | 300 | 300 | 300 | 300 | 300 |
| Total | 2510 | 2510 | 2510 | 2510 | 2510 | 2510 | 2510 |
| Type name | A-1 | A-2 | A-3 | A-4 | A-5 | A-6 | A-7 |
| Non-volatile content (%) | 40.2 | 40.2 | 40.2 | 40.2 | 40.2 | 40.2 | 40.2 |
| Molecular weight (MN) | 17000 | 17000 | 18000 | 19000 | 16000 | 17000 | 17000 |
| Hydroxyl group value (solid contents) | 57.9 | 57.9 | 57.9 | 35.6 | 80.2 | 57.9 | 57.9 |
| Acid value (solid contents) | 15.2 | 7.6 | 22.9 | 15.2 | 15.2 | 15.2 | 15.2 |

Next, we obtain various kinds of coloured base coat by dispersing 60.18 parts of these chlorinated polyolefin and acrylic copolymers (A1) to (A7), 13.37 parts of butylated melamine resin (B) and 0.90 parts of dechlorinating catcher (C) in advance with a sand mill and then agitating and dispersing 800 parts of resin coated aluminium (B) and 0.90 and 0.45 parts respectively of ultraviolet ray absorber and light stabilizer with the agitator. Table 2 indicates those coloured base coats.

TABLE 2

| Name of type of coloured base coats | A-1 | A-2 | A-3 | A-4 | A-5 | A-6 | A-7 | A-8 | A-9 |
|---|---|---|---|---|---|---|---|---|---|
| Polyolefin acrylic graft copolymer containing anhydride (40%) | 60.18 | ← | ← | ← | ← | ← | ← | ← | ← |
| Butylated melamine resin (60%) | 13.37 | ← | ← | ← | ← | ← | ← | ← | ← |
| Resin coated aluminium | 8.00 | ← | ← | ← | ← | ← | ← | ← | None |
| Dechlorinating catcher | 0.90 | ← | ← | ← | ← | ← | ← | None | 0.90 |
| UVA | 0.90 | ← | ← | ← | ← | ← | ← | ← | ← |
| HALS | 0.45 | ← | ← | ← | ← | ← | ← | ← | ← |
| Additive (Dispersing agent RC) | 8.00 | ← | ← | ← | ← | ← | ← | ← | ← |
| Flow levelling agent | 0.20 | ← | ← | ← | ← | ← | ← | ← | ← |
| Solvent | 8.00 | ← | ← | ← | ← | ← | ← | 8.90 | 8.00 |
| Ordinary aluminium | None | ← | ← | ← | ← | ← | ← | ← | 8.00 |
| Total | 100.00 | ← | ← | ← | ← | ← | ← | ← | ← |

Example 1 to 7 correspond to coloured base coat types A-1 to A-7 (type name). However, coloured base coats type A-8 is a case where no dechlorinating catcher is used for example 1, while coloured base coat type A-9 is a case where ordinary aluminium is used in substitution for resin coated aluminium for example 1. After that, the respective coloured base coats are coated in the following process:

Process 1: Submitted super high-strength polypropylene bumper substrate (70×150×20 mm) to surface treatment by washing with water.

Process 2: Next, after coating this substrate by spraying the coating compositions (coloured base coat) of examples 1 to 7 to a film thickness of 15 μ respectively, left the materials under normal temperature for 4 minutes for flushing.

Process 3: Further coat Elastometric 2000 Clear (thermosetting solvent type paint consisting of acrylic copolymer and melamine resin) of T B L Co., Ltd. on this wet coat film by spraying to a film thickness of 30 μ and, after 10 minutes of setting, performed baking at 120° C. for 30 minutes. Table 3 indicates the results of evaluation of such products.

TABLE 3

| Name of type of coloured base coat | A-1 | A-2 | A-3 | A-4 | A-5 | A-6 | A-7 | A-8 | A-9 |
|---|---|---|---|---|---|---|---|---|---|
| Substrate | Super high-strength polypropylene bumper substrate (surface treatment by washing with water) | | | | | | | | |
| Baking conditions | Bake at 120° C. for 30 minutes. | | | | | | | | |
| Results of Evaluation | | | | | | | | | |
| Primary adhesion (Evaluation of adherence) | 100/100 | ← | ← | ← | ← | ← | ← | ← | ← |
| Secondary adhesion | | ← | ← | ← | ← | ← | ← | ← | ← |
| Evaluation of adherence after moisture resistance | 100/100 | ← | ← | ← | ← | ← | ← | ← | ← |
| | | ← | ← | ← | ← | ← | ← | ← | ← |
| Evaluation of adherence after hot water resistance | 100/100 | ← | ← | ← | ← | ← | ← | ← | ← |
| | | ← | ← | ← | ← | ← | ← | ← | ← |
| Evaluation of heat resistance | ○ | ← | ← | ← | ← | ← | ← | Δ | Δ |
| Evaluation of storage stability | ○ | ← | ← | ← | ← | ← | ← | ← | ← |
| Evaluation of workability | ○ | ← | ← | ← | ← | ← | ← | ← | ← |
| Evaluation of gasoline resistance | ○ | ← | ← | ← | ← | ← | ← | ← | ← |

Next, explain references for comparison, we obtained chlorinated polyolefin and acrylic copolymers in the same way as in example 1, except that the polymerizing conditions were changed as shown in Table 4 and that chlorinated polyolefin, polymerization initiator and various kinds of acrylic monomers were used in the presence of polymerizing solvent as shown in Table 4. Table 4 indicates those conditions as references for comparison 1 to 6.

TABLE 4

| | References for comparison 1 | References for comparison 2 | References for comparison 3 | References for comparison 4 | References for comparison 5 | References for comparison 6 |
|---|---|---|---|---|---|---|
| Chlorinated polyolefin and acrylic copolymers | | | | | | |
| Chlorinated polyolefin containing anhydride | 167 | 1333 | 500 | 500 | 500 | 500 |
| Toluene | 1083 | 267 | 850 | 850 | 850 | 850 |
| Isobutyl meth-acrylate | 510 | 290 | 460 | 420 | 500 | 370 |
| Cyclohexyl meth-acrylate | 290 | 160 | 225 | 230 | 280 | 210 |
| 2-hydroxy ethyl meth-acrylate | 130 | 130 | 130 | 130 | 50 | 250 |
| Acrylic acid | 20 | 20 | 5 | 70 | 20 | 20 |
| Benzoyl peroxide | 5 | 5 | 5 | 5 | 5 | 5 |
| Azobisisobuty-ronitril | 5 | 5 | 5 | 5 | 5 | 5 |
| Toluene | 300 | 300 | 300 | 300 | 300 | 300 |
| Total | 2510 | 2510 | 2510 | 2510 | 2510 | 2510 |
| Type name | B-1 | B-2 | B-3 | B-4 | B-5 | B-6 |
| Non-volatile content (%) | 40.2 | 40.2 | 40.2 | 40.2 | 40.2 | 40.2 |
| Hydroxyl group value (solid contents) | 57.9 | 57.9 | 35.6 | 80.2 | 22.3 | 111.4 |
| Acid value (solid contents) | 15.2 | 15.2 | 3.8 | 53.4 | 15.2 | 15.2 |

After that, we obtained various kinds of coloured base coat in the same way as in example 1, except that we changed polyolefin, acrylic copolymers, butylated melamine resin (B), dechlorinating catcher, resin coated aluminium, ultraviolet ray absorber and light stabilizer indicated in Table 5 under the conditions as indicated there at the same time. Table 5 indicates those details. References for comparison 1 to 7 correspond to different types of coloured base coat or B-1 to B-6 (type name).

TABLE 5

| Name of type of coloured base coat | B-1 | B-2 | B-3 | B-4 | B-5 | B-6 |
|---|---|---|---|---|---|---|
| Polyolefin acrylic graft copolymer containing anhydride (40%) | 60.18 | ← | ← | ← | ← | ← |
| Butylated melamine resin (60%) | 13.37 | ← | ← | ← | ← | ← |
| Resin coated aluminium | 8.00 | ← | ← | ← | ← | ← |
| Dechlorinating catcher | 0.90 | ← | ← | ← | ← | ← |
| UVA | 0.90 | ← | ← | ← | ← | ← |
| HALS | 0.45 | ← | ← | ← | ← | ← |
| Additive (Dispersing agent RC) | 8.00 | ← | ← | ← | ← | ← |
| Flow levelling agent | 0.20 | ← | ← | ← | ← | ← |
| Solvent | 8.00 | ← | ← | ← | ← | ← |
| Ordinary aluminium | None | ← | ← | ← | ← | ← |
| Total | 100.00 | ← | ← | ← | ← | ← |

Those references for comparison (coloured base coat types B-1 to B-6) were coated under the same conditions as example. The results of evaluation are indicated in Table 6.

TABLE 6

| Name of type of coloured base coat | B-1 | B-2 | B-3 | B-4 | B-5 | B-6 |
|---|---|---|---|---|---|---|
| substrate | \multicolumn{6}{c}{Super high-strength polypropylene bumper base material (surface treatment by washing with water)} | | | | | |
| Baking conditions | Bake at 120° C. for 30 minutes. | | | | | |
| Results of Evaluation | | | | | | |
| Primary adhesion (Evaluation of adherence) | 80/100 | 60/100 | 100/100 | 100/100 | 100/100 | 100/100 |
| Secondary adhesion | | | | | | |
| Evaluation of adherence after moisture resistance | 80/100 | 60/100 | 90/100 | 90/100 | 95/100 | 90/100 |
| Evaluation of adherence after hot water resistance | 80/100 | 60/100 | 90/100 | 90/100 | 95/100 | 90/100 |
| Evaluation of heat resistance | ○ | △ | ○ | ○ | ○ | ○ |
| Evaluation of storage stability | △ | ○ | ○ | △ | ○ | ○ |
| Evaluation of workability | ○ | △ | ○ | ○ | ○ | ○ |
| Evaluation of gasoline resistance | ○ | △ | △ | ○ | △ | ○ |

As shown in Table 6, the coloured base coats of references for comparison were all confirmed to be inferior to that of the example in respect of adhesion. The evaluate them individually, B-1 is believed to have deteriorated in adhesion because of improper chlorinated polyolefin to acrylic copolymer ratio. B-2 has poor compatibility with melamine because of improper chlorinated polyolefin to acrylic copolymer ratio. B-3 is poor in both low-temperature hardening capacity and gasoline resistance for reason of low oxidation. B-4 dropped in waterproofing and became poor in storage stability because of high oxidation. B-5 has poor intercoat adhesion due to low OH value. B-6 dropped in both waterproofing and hardening capacity because of high OH value.

As explained so far, the present invention can provide a thermosetting coating composition demonstrating excellent adhesion to substrate in the case where coloured base coat and top clear coat are coated on polyolefinic substrate by 2-coat 1-bake method without primer and dried by baking.

Moreover, by containing dechlorinating catcher, the present invention can delay deterioration of coated film (yellowing of resin, discoloration of aluminium, instability during storage).

Furthermore, it can also prevent discoloration, peeling by agglomeration due to deterioration of aluminium, by using resin coated aluminum pigment as aluminium.

Still more, it can prevent deterioration of substrate by containing ultraviolet ray absorber and light stabilizer.

In this way, the present invention can provide an excellent thermosetting coating composition which can be coated on polyolefinic substrate by 2-coat, 1-bake method without primer, providing excellent long-term weatherability, durability as well as coated film appearance with excellent gloss and vividness.

Yet more, the 7th and 8th inventions of the present application can provide painted body having excellent adhesion, weatherability, good appearance, etc. realized by 2-coat 1-bake method coated on polyolefinic substrate by 2-coat 1-bake method without primer.

We claim:

1. A thermosetting coating composition comprising a graft copolymer obtained by copolymerizing acrylic monomers, unsaturated carboxylic acids, acrylic monomers containing hydroxyl group with chlorinated polyolefin containing anhydride in the presence of an organic solvent phase, and melamine resin, which is available for use as a primerless coloured base coat of a 2-coat, 1-bake coating for a polyolefinic substrate.

2. A thermosetting coating composition as defined in claim 1, wherein said graft copolymer comprises acrylic monomers representing 30% to 94.5 wt % of total volume of whole monomers, unsaturated carboxylic acids representing 0.5 to 7.0 wt % of total volume of whole monomers and acrylic monomers containing hydroxyl group representing 5 to 25 wt % of total volume of whole monomers of chlorinated polyolefin containing acid anhydride, and a number-average molecular weight of approximately 10,000 to 25,000.

3. A thermosetting coating composition as defined in claim 1, wherein said melamine resin is butyl etherified melamine resin and the graft copolymer to melamine resin ratio in solids content by weight is 70–90 to 30–10.

4. A thermosetting coating composition as defined in claim 1, wherein the coating composition contains dechlorinating catcher representing 0.5 to 2.5 wt % for the total solids by weight of said graft copolymer and melamine resin.

5. A thermosetting coating composition as defined in claim 1, wherein the coating composition contains resin coated aluminum representing 5 to 25 wt % for the total solids by weight of said graft copolymer and melamine resin.

6. A thermosetting coating composition as defined in claim 1, wherein the coating composition contains an ultraviolet ray absorber and a light stabilizer.

7. A coated body comprising a substrate, a coloured base coat coated on the surface of said substrate and a top clear coat coated on the surface of said coloured base coat and produced by a 2-coat, 1-bake method which comprises coating of said coloured base coat and said top clear coat on said substrate, and baking said substrate having said coatings thereon, wherein said substrate is a polyolefinic based material having stable surface properties and said coloured base coat is said thermosetting coating composition of claim 1.

8. A coated body comprising a substrate as defined in claim 7, wherein the substrate is a bumper made of super high-strength polypropylene securing sufficient adhesion by washing with water.

9. A thermosetting coating composition as defined in claim 1, wherein said thermosetting coating composition is baked at at least 120° C.

10. A thermosetting coating composition as defined in claim 7, wherein said thermosetting coating composition is baked at at least 120° C.

11. A thermosetting coating composition as defined in claim 1, which has a number-average molecular weight of approximately 10,000 to 25,000.

12. A thermosetting coating composition as defined in claim 7, which has a number-average molecular weight of approximately 10,000 to 25,000.

13. A thermosetting coating composition as defined in claim 1, wherein the acrylic monomers are selected from the group consisting of methyl (meth) acrylate, ethyl (meth) acrylate, n-propyl (meth) acrylate, i-propyl (meth) acrylate, n-butyl (meth) acrylate, i-butyl (meth) acrylate, tert-butyl (meth) acrylate, 2-ethyl-hexyl (meth) acrylate, lauryl (meth) acrylate, cyclo-hexyl (meth) acrylate, benzyl (meth) acrylate, dibromopropyl (meth) acrylate, tribromopropyl (meth) acrylate and aceto-acetoxyl ethyl (meth) acrylate.

14. A thermosetting coating composition as defined in claim 1, wherein said unsaturated carboxylic acids are an unsaturated monocarboxylic acid.

15. A thermosetting coating composition as defined in claim 1, wherein said acrylic monomers containing hydroxyl group is selected from the group consisting of 2-hydroxyl ethyl (meth) acrylate, 2-hydroxy propyl (meth) acrylate, 3-hydroxy propyl (meth) acrylate, 2-hydroxy butyl (meth) acrylate, 3-hydroxy butyl (meth) acrylate and 4-hydroxy butyl (meth) acrylate.

16. A thermosetting coating composition as defined in claim 1, wherein the polyolefin of said chlorinated polyolefin containing anhydride is ethylene, propylene, ethylene-propylene copolymer, 1-butene, propylene-butene copolymer, ethylene-α-olefin copolymer and propylene-butadine copolymer, wherein the chlorination ratio is 15–30%.

17. A coated body comprising a substrate, a coloured base coat coated on the surface of said substrate and a top clear coat coated on the surface of said coloured base coat and produced by a 2-coat, 1-bake method which comprises coating of said coloured base coat and said top clear coat on said substrate, and baking said substrate having said coatings thereon at at least 120° C., wherein said substrate is a polyolefinic based material having stable surface properties and said coloured base coat is said thermosetting coating composition of claim 2.

* * * * *